Figure 1:
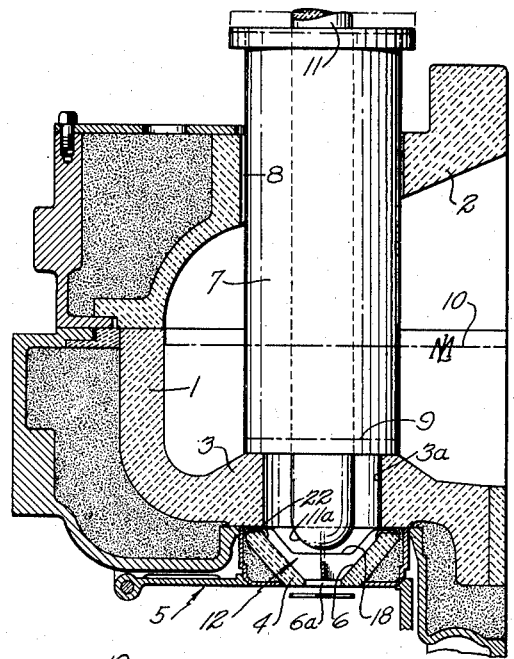

May 6, 1952 R. H. PARK 2,596,042
SLOW SPEED GLASS FEEDER
Filed Jan. 10, 1950

INVENTOR
ROBERT H. PARK
BY Parham & Bates
ATTORNEYS

Patented May 6, 1952

2,596,042

UNITED STATES PATENT OFFICE 2,596,042

SLOW SPEED GLASS FEEDER

Robert H. Park, West Hartford, Conn., assignor to Emhart Manufacturing Company, a corporation of Delaware Application January 10, 1950, Serial No. 137,699

5 Claims. (Cl. 49—55)

This invention relates to improvements in glass feeders and more particularly to improvements in glass feeders having a glass discharge outlet through which molten glass is fed from a supply body of glass in submerging relation to the outlet, successive portions of a glass stream or column issuing from the outlet being cut off periodically by feeder shears to form mold charges.

A feeder of the type described in widespread use comprises a feed spout in which a supply body of molten glass is maintained at a substantially constant level over a feed outlet comprising a vertical opening in the bottom of the feed spout and the bottom-orificed cavity of a downwardly tapering orifice ring which is supported against the bottom of the feed spout with its cavity and bottom orifice in axial alignment with the opening in the bottom of the feed spout. In such a feeder, an example of which is shown in U. S. Patent No. 1,760,254, flow of glass from the supply body in the feed spout into the upper end of the outlet is regulably controlled by a vertically adjustable tubular gate valve depending from above into the glass of the supply body in line with the outlet and having its lower end positioned at a predetermined distance above the upper end of the outlet. This controls the amount or weight of glass in each of successive charges which are severed from successive suspended mold charge masses of glass by suitably positioned and operated shears beneath the outlet. The diameter of the issuing glass and hence of the mold charges is determined by the diameter of the orifice in the bottom of the orifice ring and may be changed by selective use of orifice rings having orifices of different sizes. The feeder referred to has a vertically reciprocating plunger depending through the tubular gate valve into the glass in the outlet in spaced concentric relation with the tubular gate valve and the wall of the outlet. The reciprocations of the plunger aid in controlling the formation of successive mold charge masses of glass in suspension from the outlet, whereby the mold charges obtained by the periodic glass cutting operations of the feeder shears are given a predetermined artificial shape.

The frequency of the glass cutting operations of the feeder shears may be adjusted within a wide range, but of course must be co-ordinated with the suspended charge mass forming operations of the feeder. The frequency of formation by the feeder of successive suspended mold charge masses of controlled weight and shape and having a given diameter may likewise be varied by vertical adjustment of the tubular gate valve in relation to the upper end of the outlet and/or by vertical adjustment of the path of reciprocatory movements of the plunger and/or the amplitude of such reciprocatory movements. The length of time between shear cuts during which issuance of glass from the feeder orifice has been halted is a controlling factor in determining the feeder speed and this in turn may be regulably controlled within limits by upward strokes of the reciprocating plunger in the operation of a bottom-outlet feeder of the character described.

There is, however, a definite limit on the time after a charge severing operation before glass starts to flow downward through the orifice of such a feeder. Generally speaking, this is set by the distance the glass can be drawn up into the outlet in response to an upward stroke of the plunger without impairing the production of satisfactory mold charges by the feeder. If glass should be drawn too high in the outlet, inflowing air will be trapped by overlapping glass when it resumes downward flow, producing the defect known as blisters in the mold charges.

For these and other reasons, bottom-outlet feeders heretofore in use and substantially as just described cannot be adjusted to feed satisfactory mold charges at a speed below a given rate for a required size or diameter of charge. In consequence, if an associate glassware forming machine or entity cannot operate at this speed, a considerable amount of glass issuing from the feeder orifice must be diverted to cullet. Other known bottom-outlet feeders, such as those which include means to apply pneumatic impulses to the glass in the outlet instead of the reciprocating plunger action described, suffer from the same disability.

An object of the invention is to reduce the speed of a bottom-outlet glass feeder to a limit substantially below that heretofore possible.

A further object of the invention is to provide for feeding of mold charges by a bottom-outlet feeder of the character described at a relatively slower speed than heretofore has been possible without impairing the operations or results of the usual charge weight and shape controlling means of such a feeder.

Another object of the invention is the provision of a simple but effective feeder speed reducing orifice ring and baffle assembly for a bottom-outlet glass feeder.

Figure 6:
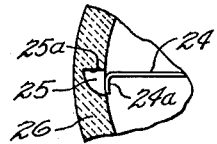
Figure 7:
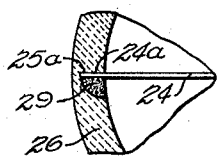
Figure 2:
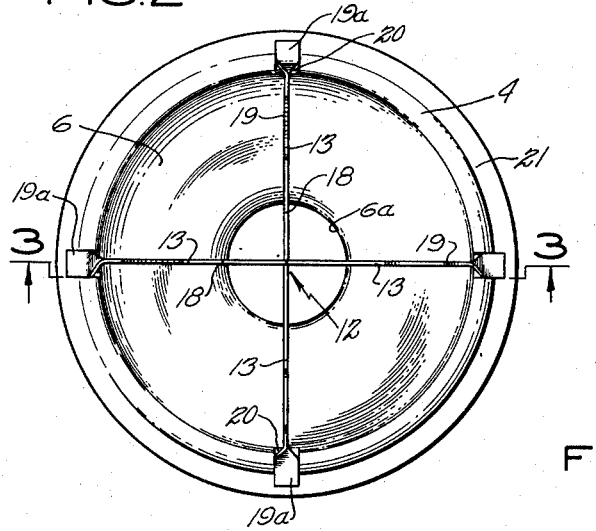
Figure 4:
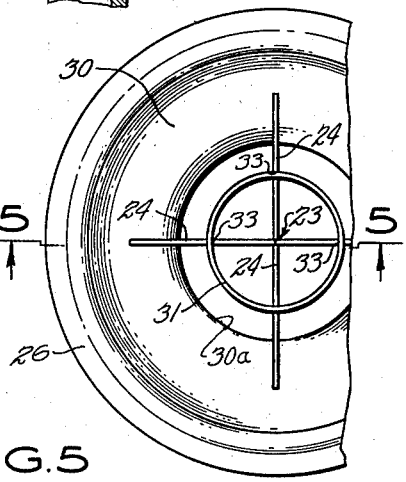
Figure 3:
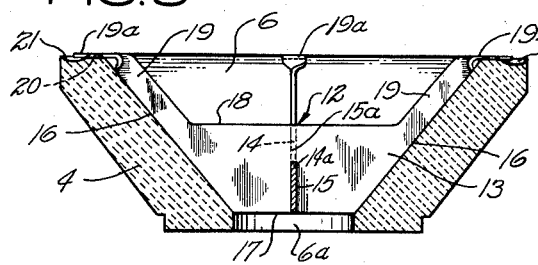
Figure 5:
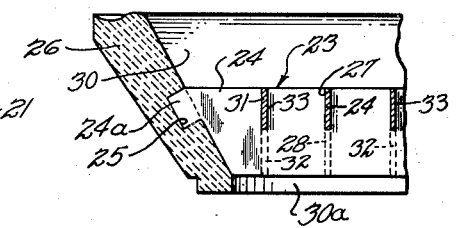

Other objects and advantages of the invention will hereinafter be pointed out or will be obvious from the description of a practical embodiment of the invention as shown by the accompanying drawings, in which Fig. 1 is a longitudinal vertical section through the spout portion of a bottom-outlet feeder provided with an orifice ring and baffle of the invention, Fig. 2 is a relatively enlarged plan view of the orifice ring and baffle assembly alone, Fig. 3 is a section along the line 3—3 of Fig. 2, Fig. 4 is a view like Fig. 2 but of an orifice ring having a relatively larger orifice and equipped with a different form of flow retarding baffle, Fig. 5 is a section along the line 5—5 of Fig. 4, and Figs. 6 and 7 are fragmentary views illustrating different steps in the operation of attaching the baffle of the Fig. 4 form of the invention to its orifice ring.

In Fig. 1, the numeral 1 designates a feeder spout provided with a cover 2. The spout bottom includes a vertical outlet portion 3 formed to define a vertical outlet passage 3a. An orifice ring 4 is supported by suitable conventional means such as indicated generally at 5 against and in line with the lower end of the spout outlet portion 3 so that the cavity, designated 6, of the orifice ring supplements the outlet passage 3a to provide a well or impulsion chamber for the spout, terminating at its bottom in a discharge orifice 6a formed in the bottom of the orifice ring centrally thereof. The orifice 6a is of a predetermined diameter which in the example shown and generally is considerably smaller than the diameter of the outlet passage 3a, the wall of the orifice ring cavity 6 sloping regularly from the lower end of the outlet passage 3a to the orifice 6a.

A refractory tubular gate valve 7 depends through an opening 8 in the spout cover 2 and in glass charge feeding operations has its lower end disposed at a predetermined distance above the upper end of the outlet structure 3, as for example at the level indicated by the dotted line position thereof designated 9. It will be understood that the tubular member 7 is adjustably supported by a suitable supporting means, none shown, as is well known in the art. The full line position of the tubular member 7 as shown in Fig. 1 is to shut off all flow of glass to the outlet passage to permit change of an orifice ring or for other reasons.

In use, molten glass from a source flows into the spout from a suitable glass flow channel, not shown, so that glass is maintained continuously in the spout to a predetermined level, as to the level indicated at 10 in Fig. 1. A vertically reciprocable refractory plunger 11 depends through the tubular member 7 into the glass impulsion well or outlet passage and, as hereinbefore stated, is reciprocated by suitable known supporting and operating means, not shown, to impart alternating extrusive and retractive impulses to the glass in the impulsion well or outlet above and in line with the orifice 6a of the orifice ring.

The feeder structure and operation described so far are conventional and form no part of the present invention.

According to the present invention, the orifice ring is provided with a glass flow retarding baffle, generally indicated at 12, in Figs. 1, 2 and 3, and comprising a plurality of baffle arms or branches 13 joined together at their inner ends at the vertical axial line of the orifice ring and extending radially from such line to the wall of the orifice ring. The example shown has four of these arms or branches, spaced angularly 90° apart so as to form a cross. In forming this cruciform baffle, two similar strips of a light gauge suitable metal, such as a platinum alloy, stainless steel, or other suitable heat resistant metal or material may be disposed edgewise and so as to intersect each other at their middle portions. As best seen in Figs. 3, the strips are provided with complementary vertical saw cuts indicated at 14 and 15, respectively, leaving uncut connecting portions 14a and 15a, respectively, adapted to fit in the saw cuts 15 and 14 when the two strips are crossed at their middle portions with the upper and lower edges, respectively, of each, flush with like edges of the other. The arms of the cross thus formed may be welded or otherwise further secured together at the center of the cross if deemed necessary or desirable. The arms 13 of this cruciform baffle have outwardly and upwardly inclined terminal edges indicated at 16 conforming to the shape of the wall of the orifice ring cavity 6 and fitting closely against such wall. At this time, the bottom edges, indicated at 17, of the arms of the cruciform baffle lie in a horizontal plane above but preferably close to the upper end of the orifice 6a of the orifice ring. The height or vertical extent of the arms 13 at the center of the cruciform baffle and outwardly therefrom for the greater part of their radial extent is considerably less than that of the orifice ring cavity, their upper edges, indicated at 18, Figs. 1 and 3, being located at a substantial distance below the level of the upper end of the orifice ring cavity. This is to allow downward movement of the tip 11a of the feeder plunger 11 into the orifice ring cavity as shown in Fig. 1 if desired. The arms 13 may have and in the example of Figs. 1 to 3, inclusive, are shown as having upwardly and outwardly inclined relatively narrow integral coplanar extensions 19 on the outer end portions of the radial arms 13. The extensions 19 extend next to the wall of the orifice ring cavity to and beyond the upper end thereof and terminate in projecting end portions or tabs 19a which are twisted 90° from the plane of the extensions 19 and bent downwardly to lie in radial slots 20 in the top of the orifice rings, as best seen in Fig. 3. These slots 20 extend from the inner surface of the orifice ring into an annular groove 21 in the top of the orifice ring. When the orifice ring is applied to the bottom of the feed spout, suitable luting 22 is placed on the top surface of the orifice ring to be pressed between the orifice ring and the spout bottom and will aid in securing the end portions of the baffle arm extensions in place. The baffle thus will be fastened in place in the orifice ring against any upward stress thereon by reason of an upward stroke of the feeder plunger.

It will be understood that a baffle substantially as described may be formed with more or less arms than are shown in the example and that these arms or a different number of arms may be formed separately and joined together at their inner ends in the same or any suitable different angular relationship in any suitable known way, as by welding.

In the form of baffle shown in Figs. 4 and 5 and generally designated 23, the component arms are indicated at 24 and have outer integral attaching extensions 24a disposed in recesses 25 in the wall of an orifice ring 26. The arms 24 may be formed of intermediately crossed strips of a light gauge suitable metal or other suitable heat resistant material as in the case of the baffle 12 of Figs. 1 to 3, inclusive, such strips being disposed vertically edgewise and having complementary saw cuts 27 and 28 in their middle portions for joining them together in the form of a cross, as in the case of the first described form of baffle. The recesses 25 in the wall of the orifice ring 26 are each formed with a generally radial straight side wall 25a, as best seen in Figs. 6 and 7. In applying the baffle 23 to the orifice ring 26, the attaching tabs 24a are first bent laterally as shown in Fig. 6 to enable positioning of the baffle in the orifice ring with these tabs disposed inwardly of the recesses 25. The tabs are then bent angularly outward into the recesses until they are disposed flatwise against the straight side walls 25a of the recesses, as in Fig. 7. Ceramic luting or cement, indicated at 29, Fig. 7, then is placed in the recesses 25 to hold the fastening tabs in place.

The orifice ring 26 containing the baffle 23 as shown in Figs. 4 and 5 has a downwardly tapering flow cavity 30 and an orifice designated 30a which is relatively larger than in the case of the orifice ring 4 of the preceding views. The baffle 23 is of course appropriately shaped and of suitable size to fit in the orifice ring 26 in a position therein substantially like that of the baffle 12 in the orifice ring 4.

To provide more friction in the glass moving in the orifice ring 26, either upwardly or downwardly, the baffle 23 may be formed to have more of the arms 24 and/or other friction creating means may be provided in the form of a vertical ring 31 intersecting the branches 24 at a predetermined radial distance outward from the center line of the baffle. The ring 31 may be formed of arcuate components having their ends fastened to adjacent arms 24 by welding or other known means or it may be a one-piece ring provided with vertical saw cuts as indicated at 32, Fig. 5, cooperating with vertical saw cuts 33, Figs. 4 and 5, in the arms 24 to connect the ring and the arms together with the upper and lower edges of all these parts at the same levels, respectively. A similar ring may be incorporated in a like fashion in the baffle 12 and either form of baffle may be constructed with a plurality of differently sized such rings and with more or less of the radial arms than the examples shown.

In the operation of a feeder of the type shown having an orifice ring equipped with a flow retarding baffle of the present invention, the feeder speed may be reduced to approximately half the minimum at which the same feeder without the baffle can be operated with satisfactory results. The charges obtained at this relatively reduced and low feeder speed may be controlled as to shape and weight as in the case of the feeder without the use of the invention. The baffle not only retards outward flow of glass through the orifice but also retards upward movement of glass into and above the orifice in response to an upward stroke of the plunger and thus resists the tendency of glass to be pulled up high enough to cause blisters when the plunger is being operated with a relatively long upward stroke and a relatively low setting as may at times be desirable for particular charge shaping effects. The baffle is completely disposed above the orifice and the glass issuing therefrom thus will be of solid mass throughout its cross-section and suitable to form a suspended mold charge mass of the desired size and shape.

The baffle presents only thin edges to the glass in the line of its movement upwardly or downwardly and thus provides an area of shear which tends to hold the glass by viscous drag without substantial reduction of the area of flow passage. The orifice of the orifice ring is of course completely unobstructed when the baffle is positioned in the ring cavity completely above such orifice as is preferred. The glass flow retarding action of the baffle is greatest at its center where the glass is relatively hotter and less viscous and decreases along the divergent radial arms toward the wall of the outlet passage. The cruciform baffle will have a substantial supporting action at its center on the glass passing therebeneath and this is of advantage in slow speed feeding of glass from an orifice in satisfactory suspended mold charge masses.

Glass flow retarding means of the invention may vary widely from the details of the illustrative examples shown in the drawings and herein particularly described and I, therefore, do not wish to be limited to such details.

I claim:

1. An orifice structure for a glass feeder comprising an orifice ring and a flow retarding baffle fitting in said ring and comprising a plurality of arms interconnected at the axial line of the ring and extending radially in angularly spaced relation to the inner wall of the ring, said baffle arms being light gauge strips disposed edgewise in the line of movement of molten glass in either of opposite directions in the orifice ring and the terminal edges of said arms extending to and conforming to the contiguous portions of the wall of the orifice ring, said arms having extensions at their terminal portions made fast to the wall of the orifice ring.

2. An orifice structure as defined by claim 1 wherein said baffle also comprises a ring intersecting the baffle arms in concentric relation with the wall of the orifice ring.

3. An orifice structure for a glass feeder comprising a refractory orifice ring formed with an open inverted frusto-conical or downwardly tapering glass flow cavity therein terminating at the bottom of the ring in a relatively reduced discharge orifice, and a glass flow retarding baffle fitting in said ring above said orifice and comprising a plurality of relatively thin vertically edgewise metallic arms connected together at the axial line of the orifice ring and extending radially therefrom at a substantial distance below the plane of the upper end of the orifice ring cavity to the side wall thereof and integral extentensions on the terminal end portions of said arms engaged with portions of said orifice ring to retain said baffle in place in said ring.

4. An orifice structure as defined by claim 3 wherein said integral extensions comprise narrow strips extending edgewise upwardly and outwardly against the portion of the wall of said ring cavity above said arms to the top of the ring and terminal portions of the extensions bent angularly and downwardly to lie flatwise radially across part of the top of the orifice ring wall, the latter being provided with radial slots in its top to accommodate said terminal portions of the extensions.

5. An orifice structure as defined by claim 3 wherein said orifice ring is provided with recesses in its inner wall at the outer ends of said arms and said extensions extend into said recesses and are secured in place therein.

ROBERT H. PARK.

(References on following page)

REFERENCES CITED

The following references are of record in the file of this patent:

UNITED STATES PATENTS

| Number | Name | Date |
|---|---|---|
| 2,212,528 | Slayter | Aug. 27, 1940 |
| 2,335,135 | Staelin | Nov. 23, 1943 |
| 2,462,805 | Danner | Feb. 22, 1949 |
| 2,486,737 | Danner | Nov. 1, 1949 |

FOREIGN PATENTS

| Number | Country | Date |
|---|---|---|
| 381,582 | Great Britain | Sept. 29, 1932 |